United States Patent
Pabon (10) Patent No.: US 10,101,483 B2
(45) Date of Patent: Oct. 16, 2018

(54) VIBRATION CONTROL FOR A CEMENT EVALUATION TOOL

(71) Applicant: Schlumberger Technology Corporation, Sugar Land, TX (US)

(72) Inventor: Jahir Pabon, Newton, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 203 days.

(21) Appl. No.: 14/134,372

(22) Filed: Dec. 19, 2013

(65) Prior Publication Data

US 2015/0177404 A1  Jun. 25, 2015

(51) Int. Cl.
*G01V 1/46* (2006.01)
*G01V 1/52* (2006.01)
*E21B 47/00* (2012.01)

(52) U.S. Cl.
CPC ............ *G01V 1/46* (2013.01); *E21B 47/0005* (2013.01); *G01V 1/523* (2013.01)

(58) Field of Classification Search
CPC ....... G01V 1/46; G01V 1/523; E21B 47/0005
USPC ............................................. 367/25, 28, 35
See application file for complete search history.

(56) References Cited

U.S. PATENT DOCUMENTS

| | | | |
|---|---|---|---|
| 3,585,580 A * | 6/1971 | Vogel | G01V 1/245 327/551 |
| 4,796,237 A | 1/1989 | Hutchens et al. | |
| 5,644,186 A * | 7/1997 | Birchak | G10K 11/004 310/337 |
| 5,780,784 A | 7/1998 | Robbins | |
| 5,886,303 A | 3/1999 | Rodney | |
| 6,671,224 B1 * | 12/2003 | Pabon | G10K 11/1788 166/254.2 |
| 2003/0156494 A1 | 8/2003 | McDaniel et al. | |
| 2014/0192618 A1 * | 7/2014 | Pabon | G01V 1/46 367/34 |

OTHER PUBLICATIONS

International search report for the equivalent PCT patent application No. PCT/US2014/069910 dated Apr. 29, 2015.

* cited by examiner

*Primary Examiner* — Daniel L Murphy (57) ABSTRACT

Systems and methods for evaluating a cement installation are provided. In one example, the cement may be evaluated using a casing arrival measurement sensor that measures casing arrival signals resulting from firing a signal from a cement bond logging acoustic source. External signals (e.g., signals other than the casing arrival signals) may be attenuated by firing an attenuation firing signal.

11 Claims, 4 Drawing Sheets

VIBRATION CONTROL FOR A CEMENT EVALUATION TOOL

BACKGROUND

This disclosure relates to evaluating cement behind a casing of a wellbore. Specifically, the embodiments described herein relate to enhancing cement evaluation by actively controlling/attenuating drill collar arrival vibrations during the cement evaluation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

A wellbore drilled into a geological formation may be targeted to produce oil and/or gas from certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with one another. This desirable condition is referred to as "zonal isolation." However, the cement may not set as planned and/or the quality of the cement may be less than expected. For example, the cement may unexpectedly fail to set above a certain depth due to natural fissures in the formation.

A variety of acoustic tools, such as an ultrasonic imaging tool, may be used to verify that the cement is properly installed. For example, in a cement bond logging process, these acoustic tools may use pulsed acoustic waves as they are lowered through the wellbore to obtain acoustic cement evaluation data (e.g., flexural attenuation and/or acoustic impedance measurements). The data collected by the acoustic tools may be used to determine whether or not the cement is likely to have set properly.

Unfortunately, these tools used in downhole cement bond logging activities often operate within extreme environments, such as high temperature, high pressure, and/or high shock environments. Because these tools are oftentimes delicate and highly sensitive to external vibration, the cement bond logging process has traditionally not been feasible in a logging-while-drilling (LWD) environment, where the cement bond logging tools are incorporated to the wellbore drill string. Instead, cement bond logging has been traditionally executed as an isolated process independent from a drilling process, as the drilling process may resulting in tool-damaging debris and external vibration data (e.g., drill collar vibration) that may alter the cement bond logging results.

For example, in a traditional scenario, a drill string may be placed in the wellbore, where a drill bit may be activated to drill to a certain depth (e.g., a few 1000's of feet). Once the drilling is complete, the drill string is then removed and the cement bond logging tools are independently dropped via a wireline service. Unfortunately, this independent process is oftentimes extremely time and/or cost prohibitive because of the expense and timing of transporting, installing and uninstalling an independent wireline service to an offshore drilling rig.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems and devices for cement bond logging that have external vibration attenuation capabilities, and to methods for using such systems and devices. Such devices may be used as downhole logging-while-drilling (LWD) tools and/or other applications where the tools may be exposed to extreme environments and/or external vibration (e.g., vibration that may reduce the accuracy of the cement bond logging results). An acoustic logging device may include an acoustic source transducer configured to fire a first source pulse. The First source pulse may result in a casing arrival signal. The acoustic logging device includes an attenuation transducer configured to fire an attenuation signal. The attenuation signal attenuates external vibration separate from the casing arrival signal. A first sensor of the acoustic logging device measures a value of the casing arrival signal after the attenuation transducer has fired the attenuation signal.

In another example, a method may include attenuating at least one vibration of a drill string inserted in a cased and cemented well. The method includes obtaining at least one enhanced acoustic casing arrival signal from the cased and cemented well after attenuating the at least one vibration, measuring a value of the enhanced acoustic casing arrival signal, and determining a state of the cemented well based upon the value.

In a further example, a tangible, non-transitory, machine-readable medium, includes machine-readable instructions to: measure amplitudes of a first set of acoustic signals, measure a first set of external vibrations not associated with the first set of acoustic signals, measure amplitudes of a second set of acoustic signals, measure a second set of external vibrations not associated with the second set of acoustic signals, and determine an optimal virtual signal to be fired by a signal source transducer, wherein the optimal signal is configured to attenuate the first and second sets of external vibrations while minimizing the impact of first set of acoustic signals.

Various refinements of the features noted above may exist in relation to various aspects of this disclosure. Further features may also be incorporated in these various aspects as well. These refinements and additional features may exist individually or in any combination. For instance, various features discussed below in relation to one or more of the illustrated embodiments may be incorporated into any of the above-described aspects of this disclosure alone or in any combination. The brief summary presented above is intended to familiarize the reader with certain aspects and contexts of embodiments of this disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it may be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, this disclosure relates to external vibration attenuation for cement bond logging (CBL) tools, potentially in a logging-while-drilling (LWD) environment. For example, drilling a borehole for an oil and/or gas well often involves a drill string—several drill pipes and a drill bit, among other things—that grinds into a rock formation when drilling fluid is pumped through the drill string. A cement bond logging tool with external vibration attenuation capabilities may be included in the drill string, such that the cement bond logging process may occur in a logging-while-drilling (LWD) environment (e.g., an environment where the drill string is disposed in the borehole) or in a wireline environment where better attenuation of unwanted tool signals is desired. For example, when disposed in a drill string, CBL tools may be susceptible to inaccuracies based upon vibration of surrounding components. Accordingly, external vibration attenuation capabilities may be added to the CBL tools, as will be discussed in more detail below.

In general, the borehole may be drilled by pumping drilling fluid into the drill string, causing the drill bit to rotate and grind away rock as the drilling fluid passes through. For example, mud motors and/or conventional rotary drilling techniques may be used in the drilling process. In certain embodiments, hydraulic power of the drilling fluid may also be used to generate electricity. Specifically, a turbine generator may convert some of the hydraulic power of the drilling fluid into electrical power. In cases where the cement bond logging tool is included in the drill string, during operation of the drill string, the cement bond logging tool may be exposed to harsh environmental conditions, such as high temperature, high pressure, and high shock environments. Furthermore, even when the drill bit is not in operation, other equipment operation (e.g., operation of the CBL tools) may result in external vibration of components in the drill string (e.g., drill collar vibration). This external vibration may negatively impact accuracy of the cement bond logging results. For example, an acoustic transmission generated to excite a casing may also excite surrounding equipment (e.g., the drill collar). If not corrected, this excitation may result in less accurate cement bond logging results because signals resulting from the excitation of the surrounding equipment may be erroneously interpreted as signals resulting from the excitement of the casing.

Accordingly, the cement bond logging tool described in this disclosure may include capabilities to attenuate the negative impact of these external vibrations on the cement bond logging results. Moreover, these attenuation capabilities may enable the cement bond logging tool to operate in a logging-while-drilling (LWD) environment, resulting in increased monetary cost and time efficiencies.

Figure 1:
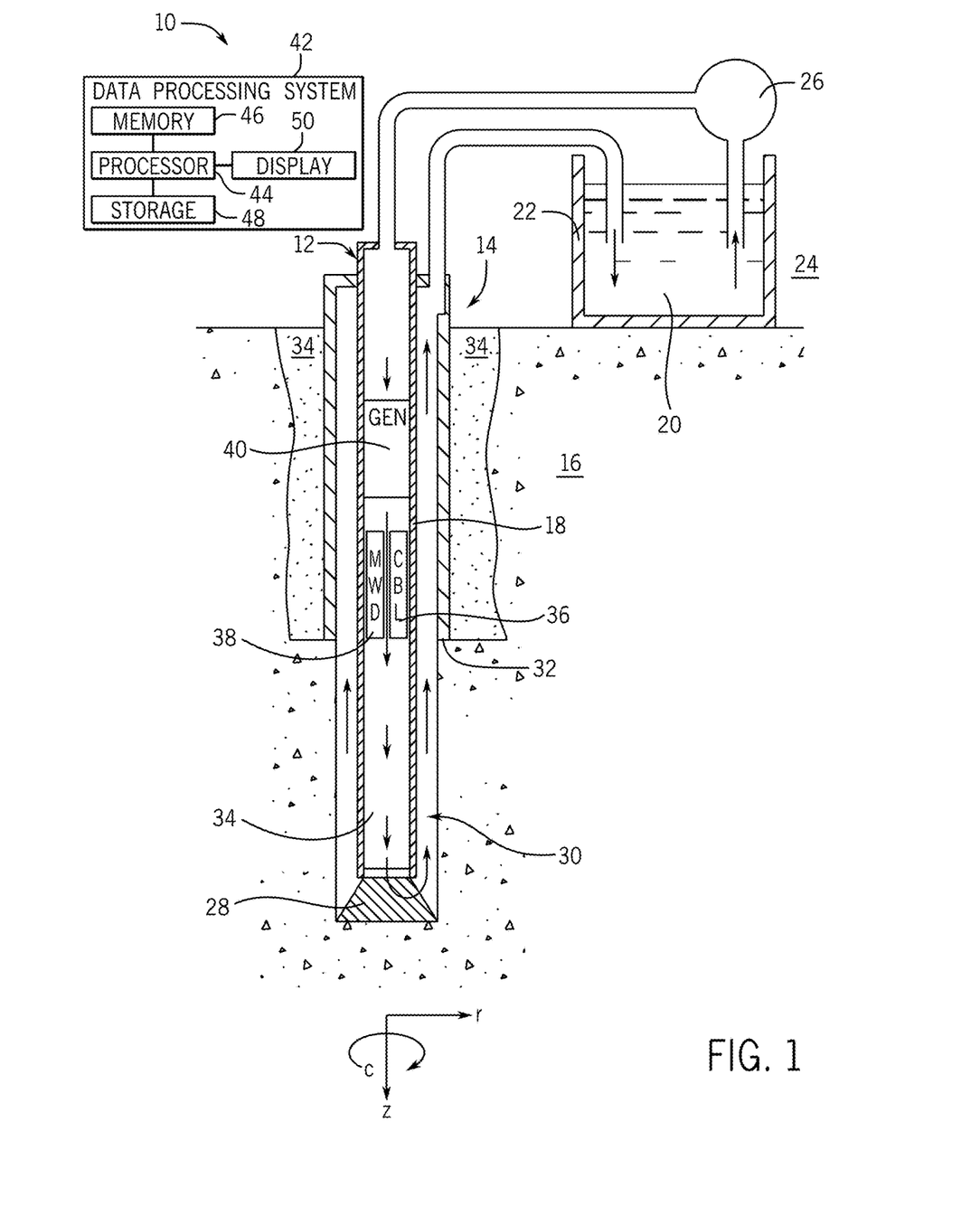
FIG. 1 is a schematic diagram of a downhole tool that employs a cement bond logging tool for operating in a logging-while-drilling environment, in accordance with an embodiment.

A downhole tool 10, shown in FIG. 1, may benefit from the cement-bond-logging tool mentioned above. The downhole tool 10 of FIG. 1 includes a drill string 12 used to drill a borehole 14 into a rock formation 16. A drill collar 18 of the drill string 12 encloses the various components of the drill string 12. Drilling fluid 20 from a reservoir 22 at a surface 24 may be driven into the drill string 12 by a pump 26. The hydraulic power of the drilling fluid 20 causes a drill bit 28 to rotate, cutting into the rock formation 16. The cuttings from the rock formation 16 and the returning drilling fluid 20 exit the drill string 12 through a space 30. The drilling fluid 20 thereafter may be recycled and pumped, once again, into the drill string 12.

As mentioned above, a casing (e.g., cylindrical casing 32) may be placed into the borehole 14 to prevent zones from interacting with one another and to prevent fluids from undesired zones entering the borehole 14. To ensure the integrity of the casing 32 a cement annulus 34 may be formed by injecting cement into the annulus between the casing 32 and the rock formation 16.

A variety of information relating to the rock formation 16 and/or the state of drilling of the borehole 14 may be gathered while the drill string 12 drills or remains inserted in the borehole 14. For instance, a logging-while-drilling (LWD) tool may measure the physical properties of the rock formation 16 or cement annulus 34, such as density, porosity, resistivity, and so forth. For example, in the illustrated embodiment, a cement bond logging (CBL) tool 36 is included in the drill collar 18, such that cement bond logging of the cement annulus 34 may be obtained. Likewise, a measurement-while-drilling (MWD) tool 38 may measure certain drilling parameters, such as the temperature of the drilling tool, pressure on the drilling tool, orientation of the drilling tool, and so forth. In some instances, electrical power may be provided to the LWD tools, CBL tool 36, and MWD tools 38 via a turbine generator 40, which may include parts that rotate circumferentially along a circumferential c-axis to generate power.

As seen in FIG. 1, the drill string 12 is generally aligned along a longitudinal z-axis. Components of the drill string 12 may be located within the drill string at various radial distances from the z-axis, as illustrated by a radial r-axis. For example, a CBL tool 36 may be aligned with a portion of the cement annulus 34 with which cement bond logging data is desired.

The CBL tool 36 may obtain acoustic measurements relating to the presence of solids or liquids behind the casing 32. For instance, the CBL tool 36 may obtain an indication of the degree of solidity of the cement annulus 34 at a location where the CBL tool 36 is aligned. In some instances, the CBL tool 36 may obtain measures as the drill string 12 is "tripping down" the borehole 14 (e.g., as the CBL tool 36 passes by a segment of the well that was recently cemented, prior to the drilling of a next segment). The CBL tool 36 provides such measurements to surface equipment (e.g., through electrical communications pathways), such as a data processing system 42 that includes a processor 44, memory 46, storage 48, and/or a display 50. In other examples, the data may be processed by a similar data processing system 42 at any other suitable location. The data processing system 42 may collect the data and determine one or more indices and indicators that, as discussed further below, may objectively indicate the presence or absence of properly installed cement. Additionally or alternatively, the data processing system 42 may correlate a variety of data obtained throughout the creation of the well (e.g., design, drilling, logging, well completion, etc.) that may assist in the evaluation of the cement. Namely, the processor 44, using instructions stored in the memory 46 and/or storage 48, may calculate the indicators and/or indices and/or may collect and correlate the other data into an integrated cement evaluation well log. As such, the memory 46 and/or the storage 48 of the data processing system 42 may be any suitable article of manufacture that can store the instructions. The memory 46 and/or the storage 48 may be read-only memory (ROM), random-access memory (RAM), flash memory, an optical storage medium, or a hard disk drive, to name a few examples. The display 50 may be any suitable electronic display that can display the logs, indices, and/or indicators relating to the cement evaluation.

In this way, the data from the CBL tool 36 may be used to determine whether the cement annulus 34 has been installed as expected. The logs, indices, and/or indicators may indicate that the cement annulus 34 has a generally solid character and therefore has properly set. The logs, indices, and/or indicators may also indicate that the cement annulus 34 has a generally liquid character, which may imply that the cement annulus 34 has not properly set. For example, when the logs, indices, and/or indicators indicate the cement annulus 34 has the generally liquid character, this may imply that the cement has drained away, was of the wrong type or consistency, and/or that fluid channels have formed in the cement annulus 34. By generating the logs, indices, and/or indicators described in this disclosure, ascertaining the character of the cement annulus 34 may be more objective and less dependent on the subjective experience of the human operator in the field that may interpret the data from the CBL tool 36.

As mentioned above, the CBL tool 36 may transmit (e.g., via a monopole transmitter) a signal to excite the casing 32. Upon excitation of the casing 32, the signal propagates into the casing 32, cement annulus 34 and rock formation 16. Resultant reflective signals, described herein as casing arrival signals are propagated back to a sensor of the CBL tool 36. These arrival signals may vary depending on the state (e.g., liquid or solid) of the cement annulus 34 behind the casing 32. For example, the amplitude of the arrival signals may be greater with increased cement annulus 34 liquidity. The arrival signals are received and analyzed, such that a determination may be made as to the state of the cement annulus 34.

As mentioned above, the CBL tool 36 may be protected from mud and debris traveling along the annulus 34, by installing shielding materials near the transmitters and/or sensors of the CBL tool 36. Unfortunately, the transmission used to excite the casing 32 may also excite nearby drilling components, such as the drill collar 18. The excitation of the nearby drilling components (e.g., the drill collar 18), if not controlled, may negatively impact the determination of the state of the cement annulus 34, because these external signals (e.g., vibrations) may erroneously be factored into the data analysis as casing arrival signals.

Figure 2:
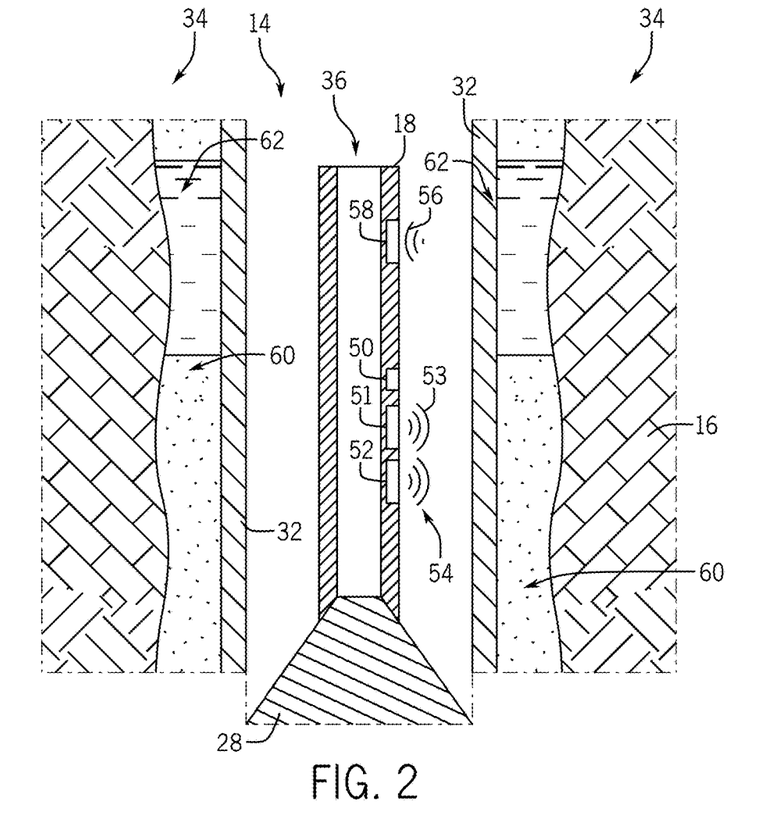
FIG. 2 is a more-detailed schematic diagram of the cement bond logging tool of FIG. 1, in accordance with an embodiment.

With this in mind, FIG. 2 describes an example of the operation of the CBL tool 36 in the borehole 14, where the external arrival signals (e.g., the arrival signals resulting from excitation of components other than the casing arrivals) are attenuated. The CBL tool 36 may include a collar vibration sensor 50, an attenuation transducer 51, a CBL acoustic source transducer 52, and a casing arrival acoustic sensor 58. As discussed above, the CBL acoustic source transducer 52 may emit acoustic waves 54 to excite the casing 32. This excitation results in relective casing arrival waves 56, which are received and measured by the casing arrival acoustic sensor 58. In some embodiments, the casing arrival acoustic sensor 58 is disposed approximately 3 feet above the CBL acoustic source transducer 52, to optimize generation of the casing arrival waves 56. Unfortunately, because the spacing between these two components is relatively short, there is not much real estate between the CBL acoustic source transducer 52 and the casing arrival acoustic sensor 58 with which to implement passive damping techniques.

Accordingly, the CBL tool 36 may be equipped with active damping through use of the collar vibration sensor 50 and/or the attenuation transducer 51. Specifically, the collar vibration sensor 50 (e.g., an accelerometer) is used to determine external vibrations (e.g. vibrations not attributed to the casing arrivals, such as drill collar 18 vibrations). For example, these external vibrations may result from emissions of the CBL acoustic source transducer 52 and/or the attenuation transducer 51). Based upon the measurements obtained from the collar vibration sensor 50, one or more optimal attenuation signals 53 may be determined. The attenuation signals 53 are designed to attenuate the external vibrations while leaving the casing arrivals 56 unaffected.

The attenuation transducer 51 in the CBL tool 36 may emit the attenuation signals 53, which attenuate the external vibrations of the drill collar 18. Thus, when the CBL acoustic source transducer 52 in the CBL tool 36 emits acoustic waves 54 out toward the casing 32, any resulting external vibrations may be attenuated and, thus, provide less interference. Accordingly, casing arrival waves 56 (e.g., reflected waves that may correspond to interfaces at the casing 32, the cement annulus 34, and/or the rock formation 16) may be received at a casing arrival acoustic sensor 58 without being affected by (or just negligibly being affected by) the external vibrations (e.g., the drill collar 18 vibrations). In some embodiments, the attenuation transducer 51 may be disposed between the CBL acoustic source transducer 52 and the casing arrival acoustic sensor 58. In some embodiments, the attenuation transducer 51 may be disposed approximately 1 foot above the CBL acoustic source transducer 52.

As discussed above, the casing arrival waves 56 may vary depending on whether the cement annulus 32 is of the generally solid character 60 or the generally liquid character 62. For example, when the cement annulus 34 is of a generally solid character 60, the casing arrival waves 56 may be of a smaller magnitude than when the cement annulus 34 is of a generally liquid character 62, due to increased absorption of the source waves exciting the casing 32. To analyze the character of the cement annulus 34, the CBL tool 36 may use any suitable number of different techniques, including measurements of amplitude and variable density from sonic acoustic waves, acoustic impedance from ultrasonic waves, and/or flexural attenuation and velocity from the third interface echo. There are mathematical models with each method that are used to calculate properties of the cement annulus 34. As mathematical models, many assumptions and simplifications of the real world may be employed. These may involve corrections and calibration or reference point checks.

Figure 3:
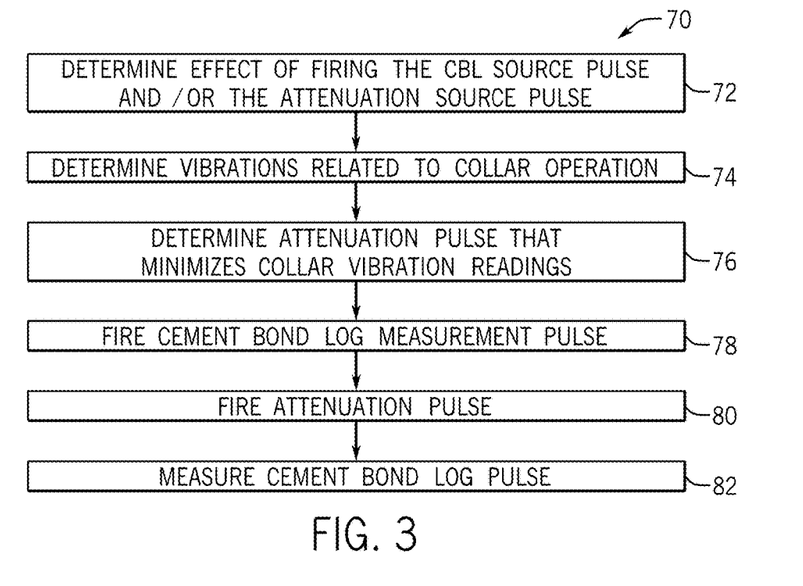
FIG. 3 is a flowchart of a method for executing cement bond logging using the tool of FIGS. 1 and 2, in accordance with an embodiment.

To verify that the cement annulus 34 has properly set, a cement evaluation workflow shown in a flowchart 70 of FIG. 3 may be followed. The cement evaluation workflow in the flowchart 70 may begin after a well has been partially drilled, cased, and cemented. It should be appreciated, however, that various portions of the workflow of flowchart 70 may occur at different times and/or in different environments, as will be discussed in more detail below.

To provide attenuation of external vibrations, a cancellation signal may be introduced to offset any impact that the external vibrations and/or pulses provided by the CBL tool 36 may have on the casing arrival signals 56. Accordingly, a calibration of the CBL tool 36 may be implemented that determines the effect (e.g., increased vibrations of the drill collar 18, etc.) caused by activating (e.g., firing an acoustic pulse from) the attenuation transducer 51, the CBL acoustic source transducer 52, or both (block 72). This calibration step may be implemented prior to and/or during placement of the drill string 12.

Upon desiring to analyze the state of the cement annulus 34, active vibration of the drill collar 18 is determined (block 74). Next, the CBL tool 36 determines an attenuation pulse or attenuation pulses that may reduce the effect active drill collar 18 vibration readings have on the casing arrival signals 56 (block 76). For example, in some embodiments an optimal generic attenuation signal may be determined. Based upon computer simulations and/or real world calibration experiments for the CBL tool 36 (either the individual CBL tool 36 or an entire species of CBL tools 36), this optimal generic signal is determined. The optimal generic signal may be used each time the attenuation capabilities of the CBL tool 36 are executed.

Alternatively, a plurality of optimal region-specific attenuation signals may be determined and used by the CBL tool 36. For example, a discrete number of regions having a range of environmental conditions that the CBL tool 36 is expected to operate in may be discerned. An optimal attenuation signal for each of these discrete regions may be determined based upon the respective region's environmental conditions. As above these optimal attenuation signals may be derived using computer simulations and/or real world calibration experiments. During use, the CBL tool 36 may determine or be provided with the proper region or region-specific attenuation signal. The CBL tool 36 may then use the region-specific attenuation signal for a corresponding region that the CBL tool 36 is currently positioned in.

Once the proper attenuation pulse or pulses are determined, the CBL acoustic source transducer 52 is activated (e.g., the CBL acoustic source pulse is fired) (block 78). Further, to reduce the impact of external vibrations, the attenuation transducer 51 is activated (e.g., the attenuation pulse is fired) (block 80). When the proper attenuation pulse is fired, the effects of the external vibration on the casing arrival signals 56 may be reduced, such that a more accurate measurement of the casing arrival signals 56 (block 82).

Figure 4:
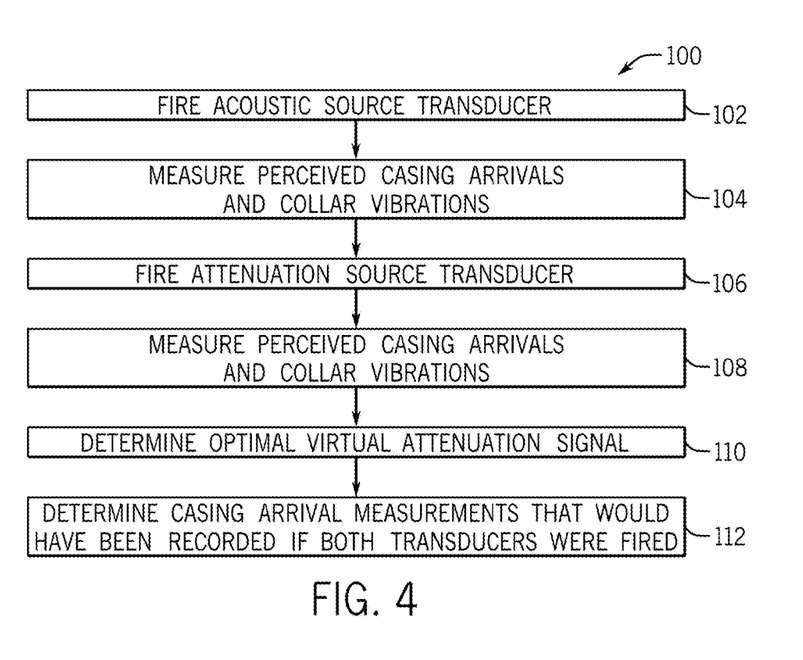
FIG. 4 illustrates a flowchart of a method for performing virtual attenuation of external vibration.

In some embodiments, virtual attenuation of external vibration may be used to more accurately collect cement bond logging results. FIG. 4 illustrates a workflow 100 for performing virtual attenuation of external vibration. During logging, the CBL source transducer 52 is fired (block 102). The perceived casing arrivals and any drill collar 18 vibrations are recorded (block 104). Next, a delayed firing of the attenuation source transducer 51 is activated (block 106) with an appropriate test signal. In some embodiments, the delayed firing of the attenuation source transducer 51 may occur approximately 10 milliseconds after firing the CBL source transducer 52. The test signal may at least have the same frequency content of the signal fired from the CBL source transducer 52. The perceived casing arrivals and any drill collar 18 vibrations are once again recorded (block 108). Next, the collar vibration data obtained in blocks 104 and 108 are used to determine the optimal virtual signal that could be fired from the attenuation transducer 51, which would result in minimal drill collar 18 vibration (block 110). This optimal virtual signal is used in conjunction with the perceived casing arrival measurements of blocks 104 and 108 to determine virtual casing arrival measurements that would have been recorded if the CBL source transducer 52 were fired in conjunction with the attenuation transducer 52 using the optimal virtual signal (block 112). These virtual casing arrival measurements may be used to determine the state of the cement annulus 34.

Figure 5:
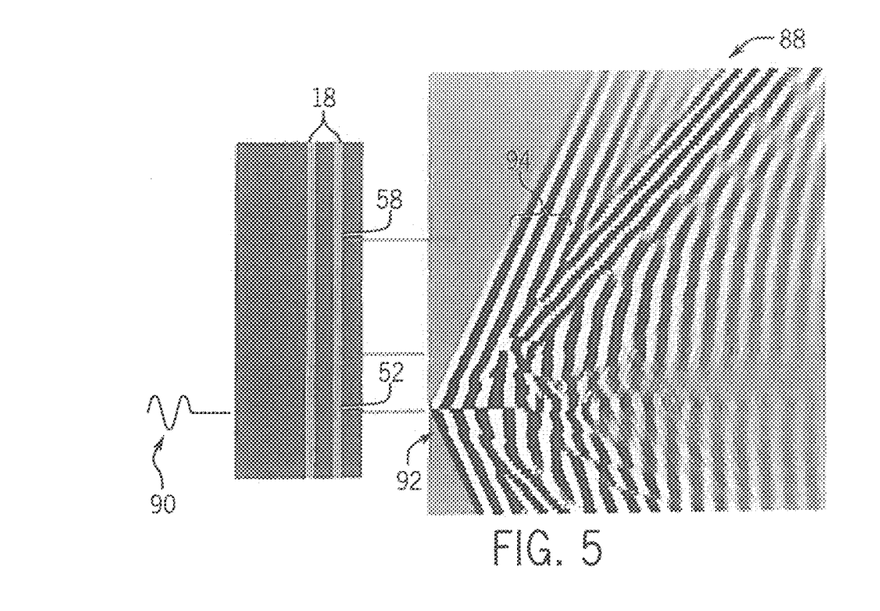
FIG. 5 illustrates a computer simulation of a cement bond logging tool without drill collar vibration attenuation.
Figure 6:
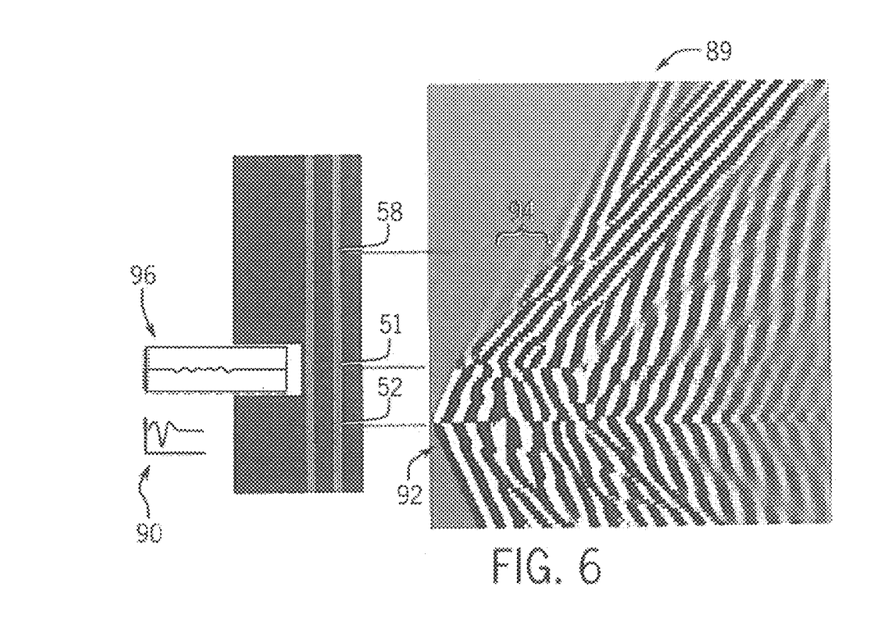
FIG. 6 illustrates a computer simulation of a cement bond logging tool with drill collar vibration attenuation.

By using the attenuation capabilities described herein, the CBL tool 36 may be used in a logging-while-drilling environment, despite increased potential interference from external vibrations. FIGS. 5 and 6 illustrate the perceived enhancements over CBL tools 36 not using the attenuation capabilities described herein.

FIG. 5 illustrates a computer simulation of drill collar axial vibration due to excitation by the acoustic CBL transmitter 52. The vibration plot 88 illustrates axial vibration signals stemming from drill collar 18 axial vibrations. The lighter color represents upward axial velocity and the darker represents downward axial velocity. The horizontal axis of the plot 88 is time and vertical axis represents locations along the drill collar 18.

The transmitter 52 fires the firing signal 90. The firing signal may, in some instances, have a 20 kHz center frequency. Upon firing of the firing signal 90, the drill collar 18 may become excited (e.g., have resultant vibrations). For example, in the vibration plot 88 at point 92, external axial vibration of the drill collar 18 is exhibited based upon excitation from the firing signal 90. Accordingly, the casing arrival acoustic sensor 58 may interpret the drill collar 18 vibrations as casing arrival vibrations by measuring the vibrations at a position 94 where the casing arrival signals are expected. As illustrated, the drill collar 18 vibrations are present at the position 94, so it may be difficult to ascertain accurate casing arrival measurements.

FIG. 6 illustrates a computer simulation of drill collar axial vibrations attenuated by an attenuation source 51. As described above, an attenuation firing signal 96 may be fired to attenuate any external vibrations (vibrations other than the casing arrival vibrations). For example, a firing signal 90 emitted from the CBL acoustic source 52 may excite the drill collar 18 or other nearby components. The attenuation firing signal 96 may act to cancel these external vibrations. Further, additional external vibrations (e.g., on the drill collar 18) may be encountered from the firing of the attenuation firing signal 96. Based upon calibration of the CBL tool 36, these external vibrations may be predicted prior to the firing and may be accounted for in determination of the proper attenuation firing signal 96. Accordingly, these external vibrations may be attenuated by the attenuation firing signal 96. The attenuation firing signal 96 is fired at the attenuation transducer 51, causing the external vibration signals in the vibration plot 89 to attenuate. Accordingly, these external vibrations are not present at the position 94 where the casing arrival acoustic sensor 58 is expecting the casing arrival signals. Thus, the casing arrival acoustic sensor 58 may more accurately measure the casing arrival vibrations at position 94, resulting in more accurate cement bond logging results.

As explained herein, by placing the CBL tool 36 in the drill collar 18, the CBL tool 36 may be used in extreme environmental conditions, such as high temperature environments with debris. By incorporating the external vibration attenuation capabilities into the CBL tool 36, external vibrations associated with the drill collar 18 may be attenuated, such that accurate cement bond logging results may be obtained, despite being disposed in a potentially highly excitable environment (e.g., a metallic drill collar 18). Accordingly, in contrast to many traditional CBL processes that use an independent cement bond logging service, the CBL tool 36 described herein may be used in an environment where a drill string is operating in the borehole. As may be appreciated, removing an independent CBL process may decrease time and monetary expenditures because the CBL process may occur as part of the drilling process.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. An acoustic logging device, comprising:
   a tool having:
      an acoustic source transducer configured to fire a first source pulse to excite a casing, wherein the first source pulse is configured to result in a casing arrival signal, comprising vibrations from the casing;
      an attenuation sensor configured to sense external vibrations separate from the casing arrival signal;
      an attenuation transducer configured to fire an attenuation signal, wherein the attenuation signal is configured to attenuate the external vibrations; wherein the attenuation transducer is configured to fire the attenuation signal based upon the external vibrations sensed by the attenuation sensor, and
      an acoustic sensor configured to measure a value of the casing arrival signal after the attenuation transducer has fired the attenuation signal,
   wherein the attenuation sensor and the attenuation transducer are disposed between the acoustic source transducer and the acoustic sensor to actively detect and damp the external vibrations traveling along the tool between the acoustic source transducer and the acoustic sensor.

2. The acoustic logging device of claim 1, wherein the tool comprises a cement bond logging (CBL) device; wherein the acoustic source transducer comprises a CBL acoustic source transducer and the first source pulse comprises a CBL source pulse; wherein the CBL source pulse is useful for cement bond logging.

3. The acoustic logging device of claim 2, wherein the attenuation sensor is configured to detect vibrations resulting from firing the CBL source pulse.

4. The acoustic logging device of claim 2, wherein the acoustic sensor is disposed approximately 3 feet above the CBL source transducer.

5. The acoustic logging device of claim 2, wherein the attenuation transducer is disposed approximately 1 foot above the CBL source transducer.

6. A method for logging a cemented well with the logging tool of claim 2 comprising:
   firing a cement bond logging (CBL) source pulse with the cement bond logging (CBL) device during a drilling operation;
   attenuating at least one vibration of a drill string component inserted in a cased and cemented well; wherein attenuating the at least one vibration comprises:
      sensing via the attenuation sensor at least one vibration including at least one vibration resulting from firing the CBL source pulse; and
      firing an attenuation signal with the attenuation transducer;
   obtaining at least one enhanced acoustic casing arrival signal from the cased and cemented well after attenuating the at least one vibration;
   measuring via the acoustic sensor a value of the enhanced acoustic casing arrival signal; and
   determining a state of the cemented well based upon the value.

7. The method of claim 6, wherein attenuating the at least one vibration comprises:
   determining an optimal generic attenuation signal based upon the sensed at least one vibration; and
   wherein the attenuation signal is the optimal generic attenuation signal and is fired prior to each time at least one acoustic casing arrival signal is obtained.

8. The method of claim 6, wherein attenuating the at least one vibration comprises:
   defining a plurality of regions having different characteristics;
   determining a particular region of evaluation corresponding to one of the plurality of regions;
   determining an optimal region-specific attenuation signal based at least upon: the sensed at least one vibration; and
   wherein the attenuation signal is the optimal region-specific attenuation signal and is fired prior to each time at least one acoustic casing arrival signal is obtained at the particular region.

9. The method of claim 6, wherein attenuating the at least one vibration comprises:
   obtaining and measuring the casing arrival signal resulting from firing the CBL source pulse prior to attenuating the at least one vibration;

wherein the attenuation signal is an attenuation test signal, the attenuating further comprising:
  obtaining and measuring a casing arrival resulting from firing the attenuation test signal;
  sensing at least one vibration including at least one vibration resulting from firing the attenuation test signal; and
  determining an optimal virtual attenuation signal that would reduce drill collar vibration while reducing any effect on any received casing arrival signals.

10. The acoustic logging device of claim 1, wherein the attenuation signal comprises an optimal generic attenuation signal that is used each time the attenuation signal is fired by the acoustic logging device.

11. The acoustic logging device of claim 1, wherein the attenuation signal is based upon a plurality of optimal region-specific attenuation signals and a particular operating region of the acoustic logging device.

\* \* \* \* \*